(No Model.)
H. F. M. PODEYN.
SHAFT PROTECTOR.
No. 600,375. Patented Mar. 8, 1898.
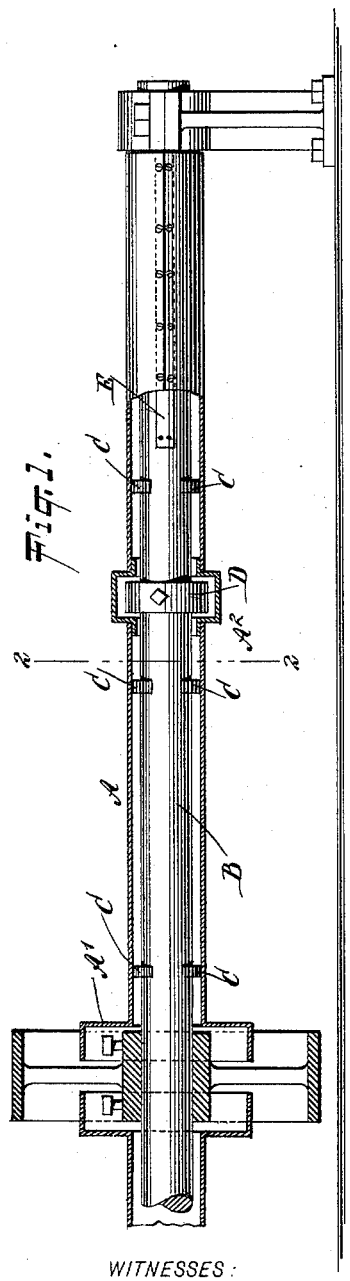
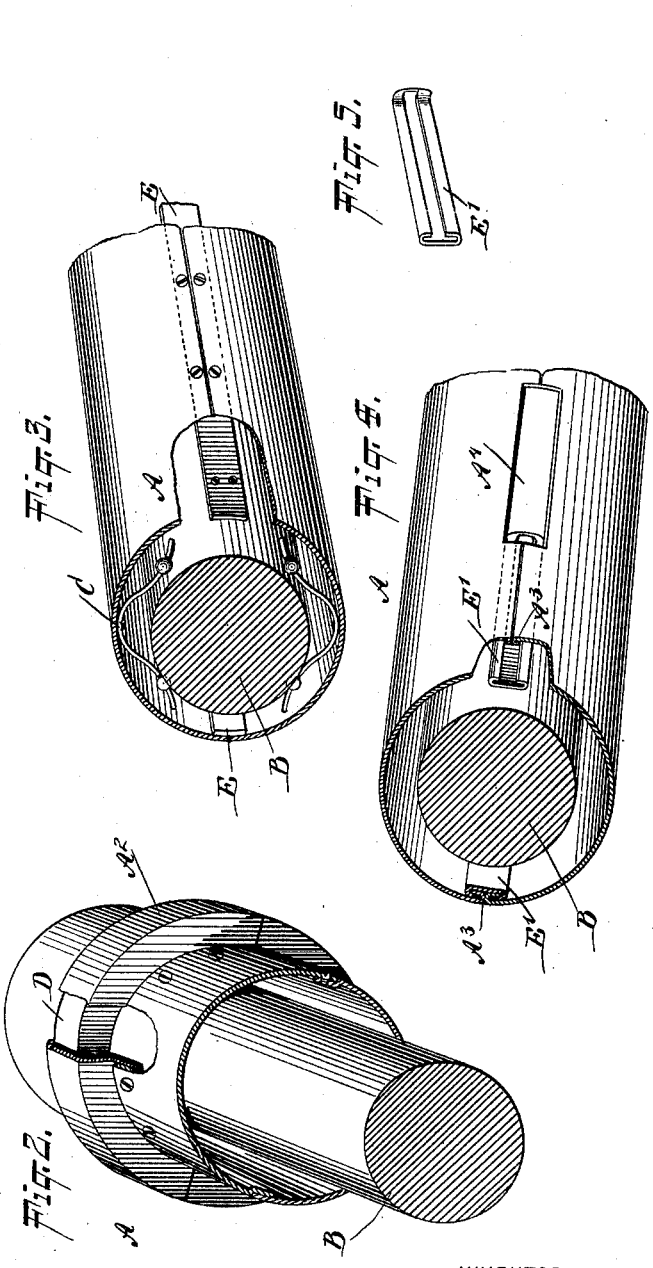
WITNESSES:
William P. Goebel.
INVENTOR
H. F. M. Podeyn
BY
ATTORNEYS.

UNITED STATES PATENT OFFICE.

HENRY F. M. PODEYN, OF BROOKLYN, NEW YORK.

SHAFT-PROTECTOR.

SPECIFICATION forming part of Letters Patent No. 600,375, dated March 8, 1898.

Application filed November 9, 1897. Serial No. 657,955. (No model.)

*To all whom it may concern:*

Be it known that I, HENRY F. M. PODEYN, of Brooklyn, in the county of Kings and State of New York, have invented a new and Improved Shaft-Protector, of which the following is a full, clear, and exact description.

The object of the invention is to provide a new and improved shaft-protector more especially designed for use on shafts at or near the floors or ground and arranged to form a hood or cover over collars, flanges, couplings, set-screws, or other parts projecting from the revolving shaft to prevent the garments of workmen and other persons from being caught, thereby avoiding bodily injury to such persons.

The invention consists of novel features and parts and combinations of the same, as will be hereinafter more fully described, and pointed out in the claims.

Reference is to be had to the accompanying drawings, forming a part of this specification, in which similar characters of reference indicate corresponding parts in all the figures.

Figure 1 is a sectional side elevation of the improvement as applied. Fig. 2 is an enlarged perspective view of part of the improvement on the line 2 2 of Fig. 1. Fig. 3 is a sectional perspective view of another part of the improvement. Fig. 4 is a similar view of a modified form of the same, and Fig. 5 is a perspective view of one of the keys for fastening the sections of the casing together.

The improved shaft-protector illustrated in the drawings is provided with a casing A, preferably made cylindrical, for inclosing a shaft B and any parts projecting therefrom—such as couplings, set-screws, collars, and the like—the casing being provided for this purpose with corresponding enlargements. For instance, as shown at the left in Fig. 1, the end of the casing A is provided with an enlargement A', fitting over the hub and set-screw of a pulley.

The casing A is supported from the shaft and held out of contact therewith by springs C, preferably arranged in pairs located diametrically opposite each other, the middle portions of the springs being riveted or otherwise secured to the inside of the casing, the free ends of the springs resting on the peripheral surface of the shaft B. (See Fig. 3.) Thus the casing A is supported with comparatively little friction from the shaft B, and consequently the said shaft is free to rotate in the usual manner; but as the projecting parts are completely inclosed the garments of the workmen or other persons passing near or over the said shaft are not liable to be caught.

As indicated in Fig. 3, the free ends of the springs C are preferably made ball shape, so as to reduce the friction between the said springs and the shaft to a minimum.

The casing A is prevented from shifting longitudinally on the shaft B, and for this purpose I provide the latter with a collar D, inclosed by a correspondingly-shaped enlargement $A^2$, formed on the casing, as indicated in Fig. 1. One end of the casing may rest against a bearing for the shaft, but in all constructions the casing is supported solely from the shaft by means of the springs referred to.

The casing A is preferably made in sections fastened together by suitable means after the sections are placed in position on the shaft, so as not to disturb the bearings thereof. Various means may be employed for fastening such sections together. For instance, as shown, the sides of the sections overlap each other, and the overlapped parts are riveted or secured together by screws, and, as shown in Fig. 3, I employ a key E, upon which are screwed the adjacent sides of the two sections, and, as shown in Fig. 4, the adjacent sides of the sections are provided with internal flanges $A^3$, engaged by a key E', slipped over the flanges through an opening $A^4$ in the side of the casing. It is evident, however, that various means may be employed for uniting the sections of the casing. Consequently I do not limit myself to any such special construction.

Having thus fully described my invention, I claim as new and desire to secure by Letters Patent—

1. A shaft-protector comprising a casing for inclosing the shaft and parts projecting therefrom, and springs attached to the casing and resting on the said shaft, to support the casing from the shaft and hold it out of contact therewith, substantially as shown and described.

2. A shaft-protector comprising a casing made in sections adapted to be fastened together, and arranged to inclose the shaft and parts projecting therefrom, and springs carried by the casing and engaging with their free ends the shaft, to support the casing from the shaft and hold it out of contact with the shaft, substantially as shown and described.

3. A shaft-protector comprising a casing made in longitudinal sections, and means for securing the sections together, springs arranged in pairs and located opposite each other, the middle portion being secured to the casing and the free ends resting on the shaft, to support the casing from the shaft, substantially as shown and described.

HENRY F. M. PODEYN.

Witnesses:
 THEO. G. HOSTER,
 JNO. M. RITTER.